US010000362B2

(12) United States Patent
Nagata

(10) Patent No.: US 10,000,362 B2
(45) Date of Patent: Jun. 19, 2018

(54) ELEVATOR CONTROL DEVICE

(71) Applicant: MITSUBISHI ELECTRIC CORPORATION, Chiyoda-ku (JP)

(72) Inventor: Ayako Nagata, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 378 days.

(21) Appl. No.: 14/912,541

(22) PCT Filed: Aug. 21, 2013

(86) PCT No.: PCT/JP2013/004931
§ 371 (c)(1),
(2) Date: Feb. 17, 2016

(87) PCT Pub. No.: WO2015/025341
PCT Pub. Date: Feb. 26, 2015

(65) Prior Publication Data

US 2016/0200547 A1 Jul. 14, 2016

(51) Int. Cl.
*B66B 1/34* (2006.01)
*B66B 1/46* (2006.01)
(Continued)

(52) U.S. Cl.
CPC ............ *B66B 1/468* (2013.01); *B66B 13/143* (2013.01); *B66B 2201/4638* (2013.01); *B66B 2201/4646* (2013.01); *G10L 2015/088* (2013.01)

(58) Field of Classification Search
CPC .................. B66B 1/468; B66B 13/143; B66B 2201/4646; B66B 2201/4638; G10L 2015/088
(Continued)

(56) References Cited

U.S. PATENT DOCUMENTS 4,491,199 A * 1/1985 Shea .................... B66B 13/143 187/316
5,255,341 A * 10/1993 Nakajima .............. B66B 1/468 340/573.1
(Continued)

FOREIGN PATENT DOCUMENTS

JP 08-268653 A 10/1996
JP 2010-254461 A 11/2010
(Continued)

OTHER PUBLICATIONS

International Search Report dated Oct. 22, 2013 for PCT/JP2013/004931 filed on Aug. 21, 2013.

*Primary Examiner* — Anthony Salata
(74) *Attorney, Agent, or Firm* — Oblon, McClelland, Maier & Neustadt, L.L.P.

(57) ABSTRACT

An elevator controller includes a microphone that receives voice of a passenger in a car, a memory that, for a destination floor specifying operation for the passenger to specify a destination floor by voice, stores a first keyword defined beforehand to signify an operation start and second keywords defined beforehand to signify a destination floor, a voice recognition unit that compares a voice inputted from the microphone with the stored first and second keywords, and a controller that, when the door of the car is fully open or fully close, the voice recognition unit recognizes the first keyword and thereafter recognizes a second keyword, registers a destination floor corresponding to the second keyword. The controller outputs a command to suspend an operation to open or close the door of the car until the destination floor specifying operation is ended after the voice recognition unit recognizes the first keyword.

20 Claims, 3 Drawing Sheets

(51) Int. Cl.
*B66B 13/14* (2006.01)
*G10L 15/08* (2006.01)

(58) Field of Classification Search
USPC ....... 187/247, 313, 316, 380–389, 391, 392, 187/393, 396, 399, 901; 340/4.1, 4.11, 340/4.14, 5.52; 704/246, 271, 275
See application file for complete search history.

(56) References Cited

U.S. PATENT DOCUMENTS

| | | | | |
|---|---|---|---|---|
| 5,952,626 | A * | 9/1999 | Zaharia | B66B 1/468 187/381 |
| 6,510,924 | B2 * | 1/2003 | Bauer | B66B 1/468 187/380 |
| 6,868,945 | B2 * | 3/2005 | Schuster | B66B 1/468 187/380 |
| 6,986,408 | B2 * | 1/2006 | Takeuchi | B66B 1/14 187/247 |
| 7,711,565 | B1 * | 5/2010 | Gazdzinski | B66B 3/00 187/396 |
| 7,841,452 | B2 * | 11/2010 | Sansevero | B66B 1/46 187/382 |
| 8,678,142 | B2 * | 3/2014 | Takeuchi | B66B 1/468 187/247 |
| 8,763,762 | B2 * | 7/2014 | Finschi | B66B 1/468 187/391 |
| 9,284,158 | B2 * | 3/2016 | Sarjanen | B66B 1/468 |
| 9,598,263 | B2 * | 3/2017 | Nagata | B66B 1/468 |

FOREIGN PATENT DOCUMENTS

| | | | |
|---|---|---|---|
| JP | 2010254461 | A * | 11/2010 |
| JP | 2013-052957 | A | 3/2013 |
| JP | 2014005126 | A * | 1/2014 |
| WO | 2011/132261 | A1 | 10/2011 |
| WO | 2011/132263 | A1 | 10/2011 |
| WO | 2012/081082 | A1 | 6/2012 |
| WO | 2012/124027 | A1 | 9/2012 |
| WO | 2012/131839 | A1 | 10/2012 |

* cited by examiner

ELEVATOR CONTROL DEVICE

TECHNICAL FIELD

The present invention relates to an elevator control device by which a passenger in a car registers a destination floor with voice.

BACKGROUND ART

A conventional elevator control device is known that recognizes, when a voice uttered by a passenger is inputted to a voice input unit such as a microphone provided in a car, the inputted voice to register a destination floor uttered by the passenger. However, in such an elevator control device that registers destination floors by the voice recognition, there is a possibility that misrecognition of voice occurs caused by influences of environmental noises or the like in the car.

In order to prevent a call from being falsely registered by a voice other than that uttered by a passenger for call registration, a method is used in, for example, Patent Document 1, in which a call registration command to be inputted after the passenger's voice input signifying a command to start voice recognition is recognized as a destination floor. Furthermore, in Patent Document 2, an operation to open or close the car door is suspended during the car passenger's utterance to thereby prevent voice misrecognition caused by the influence of the door opening/closing operation noise.

PRIOR ART DOCUMENT

Patent Document

[Patent Document 1] International Publication No. WO 2012/131839

[Patent Document 2] Japanese Patent Laid-Open Publication No. 2013-52957

SUMMARY OF THE INVENTION

Problem to be Solved by the Invention

However, in a conventional elevator control device described in Patent Document 1, if a voice signifying a command to start voice recognition is recognized and then the car door closing operation is performed during the passenger's utterance of a destination floor, a noise of the door closing operation may exert its influence to cause misrecognition of the destination floor. Furthermore, in a conventional elevator control device described in Patent Document 2, the voice misrecognition is reduced by suspending the car door opening/closing operation during the passenger's utterance; however, a problem is found that the car door opening/closing operation is suspended even by an utterance irrelevant to the destination floor registration, to thereby lower the elevator's operation efficiency.

The present invention is made to solve the problems as described above and to provide an elevator control device that suspends car door opening/closing operations from the beginning of an operation to specify a destination floor with a voice of a passenger in the car until the end of the operation.

An elevator control device according to the present invention includes: a voice input means that is provided in a car to receive a voice of a passenger in the car; a memory unit that, in relation to a destination floor specifying operation for the passenger to specify a destination floor by voice, stores a first keyword defined beforehand to signify a start of the operation and second keywords each defined beforehand to signify a destination floor; a voice recognition unit that compares the voice inputted through the voice input means with the first and second keywords stored in the memory unit; and a control unit that, when in a state in which a door of the car is fully opened or fully closed, the voice recognition unit recognizes the first keyword and thereafter recognizes one of the second keywords, registers a destination floor corresponding to the one of the second keywords, wherein when the voice recognition unit recognizes the first keyword, the control unit outputs a command to suspend an operation of opening and closing the car door, and thereafter outputs a command to cancel the suspension, and wherein if the voice recognition unit recognizes one of the second keywords within a first predetermined time after the recognition of the first keyword and does not recognize anew the first keyword within a second predetermined time after the recognition of the one of the second keywords, the control unit outputs a command to cancel the suspension of the operation of opening and closing the car door when the second predetermined time passes after the recognition of the one of the second keywords.

Effect of the Invention

In the elevator control device configured as described above, because the car door opening/closing operations are suspended from the in-car passenger's utterance of the first keyword signifying to start a destination floor specifying operation until the end of the destination floor specifying operation, it is possible to reduce the destination floor misrecognition caused by the influence of the door opening/closing operation noise. Furthermore, an utterance irrelevant to the destination floor specifying operation does not suspend the car door opening/closing operations, which thereby curbs lowering the operation efficiency.

MODE FOR CARRYING OUT THE INVENTION

Embodiment 1

Figure 1:
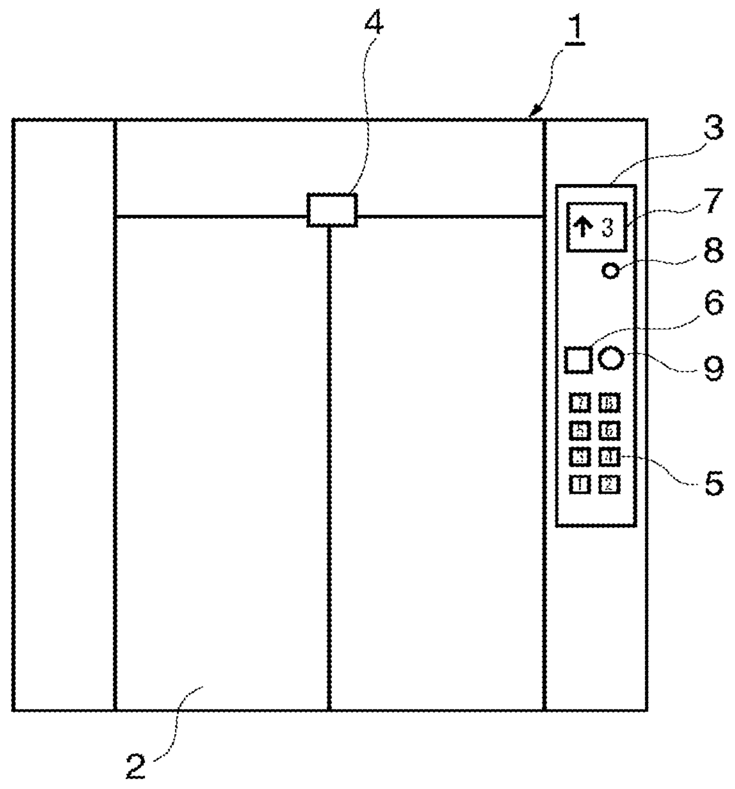
FIG. 1 is a configuration view of a car to which an elevator control device of Embodiment 1 according to the present invention is applied.

Explanation will be made about Embodiment 1 of the present invention in detail below, using figures. FIG. 1 is a configuration view of a doorway side in a car to which an elevator control device of Embodiment 1 according to the present invention is applied. The car 1 is provided with a door 2 that opens and closes for passengers to get in/off when the car 1 arrives at a hall, a car operation panel 3 by which a passenger having gotten in the car 1 specifies a destination floor, and an image pickup device 4 that serves as a passenger number detection means to detect the number of passengers to get in the car 1.

The car operation panel 3 is provided with destination buttons 5 with which a destination floor desired by a passenger is manually specified, a microphone 6 that serves as a voice input means for a passenger to specify the destination floor with the voice, and a floor indication unit 7 that indicates the current position and traveling direction of the car 1. The car operation panel is further provided with an indication light 8 that serves as a first indication means to indicate to the passengers that a destination floor specifying operation by voice has started, and a speaker 9 that serves as a second indication means to indicate whether or not the destination floor is registered by the destination floor specifying operation by voice.

Figure 2:
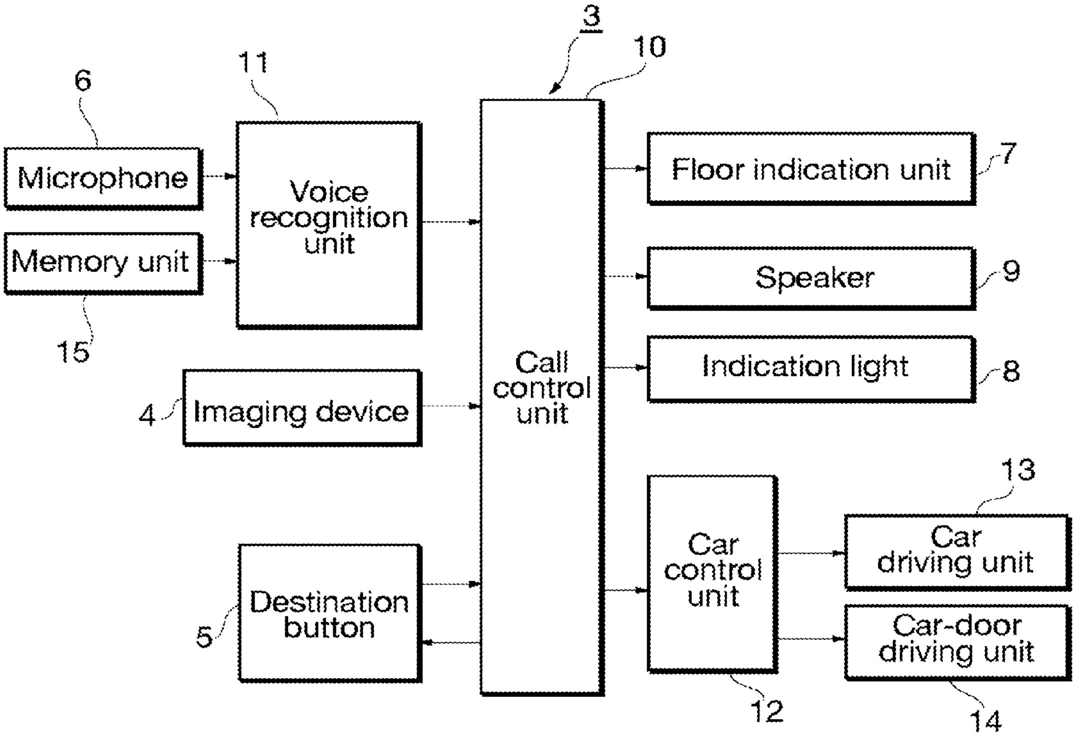
FIG. 2 is a control block diagram of the elevator control device of Embodiment 1 according to the present invention.

FIG. 2 is a control block diagram of the elevator control device of Embodiment 1 according to the present invention. As control units, there are provided a call control unit 10 in the car operation panel 3, and a car control unit 12 in a control panel (not shown in the figure). When one of the destination buttons 5 is pushed or a destination floor specified by a passenger's voice is recognized by a voice recognition unit 11, the call control unit 10 in the car operation panel 3 sends information about the destination floor to the car control unit 12. The car control unit 12 determines whether or not the received destination floor can be registered and then sends back the determination result to the call control unit 10. The call control unit 10 makes an indication to the passenger on the basis of the determination result having been sent back.

For example, when a passenger pushes a destination button 5 assigned to the fifth floor and then the car control unit 12 determines that the fifth floor can be registered, the call control unit 10 lights a lamp built in the destination button 5 assigned to the fifth floor, so that the passenger can confirm that the fifth floor is registered. When, in contrast, the car control unit 12 determines that the fifth floor cannot be registered, the call control unit 10 does not light the lamp built in the destination button 5 assigned to the fifth floor, so that the passenger can confirm that the fifth floor could not be registered.

The car control unit 12 not only sends and receives information relating to the destination floor to and from the call control unit 10, but also outputs operation commands to a car driving unit 13 that makes the car 1 travel upward or downward and to a car-door driving unit 14 that opens or closes the door 2 of the car 1 when the car 1 stops at a hall, to thereby perform traveling control of the car 1. Furthermore, information about a current position and traveling direction of the car 1 are transmitted from the car control unit 12 to the call control unit 10; on the basis of the information, the call control unit 10 displays the position of the car 1 and the traveling direction thereof on the floor indication unit 7.

Next, explanation will be made about the operation of the voice recognition unit 11. In a memory unit 15 to which the voice recognition unit 11 refers for keywords, there registered are plural first keywords each signifying a start of the destination floor specifying operation by voice, plural second keywords each signifying a destination floor, and plural third keywords each signifying the end of the destination floor specifying operation. The first keywords include, for example, "voice operation", "begin", and "start". The second keywords include words expressing floors at which the car 1 can stop. With respect to a floor such as the third floor among the stoppable floors that has plural pronunciations, plural pronunciations such as "sankai" and "sangai" are registered. The third keywords include, for example, "complete", "stop", and "end".

The voice recognition unit 11 compares the passenger's voice inputted from the microphone 6 with the keywords registered in the memory unit 15; when recognizing that the passenger's voice agrees with any of the first to third keywords, the voice recognition unit expresses the result as a piece of data to send it to the call control unit 10. For example, when recognizing a first keyword, the voice recognition unit sends a piece of data of "00" to the call control unit 10; when recognizing a third keyword, a piece of data of "99"; and when recognizing a second keyword, a piece of data corresponding to a destination floor, for example, a piece of data of "03" (in a case of the third floor).

When receiving the data piece of "00" signifying the first keyword recognition from the voice recognition unit 11, the call control unit 10 lights the indication light 8 to indicate to the passengers that a destination floor specifying operation by voice starts. In addition to the lighting, a blip of "Pi" is outputted from the speaker 9, so that a start of the destination floor specifying operation by voice can be indicated even to a passenger who does not notice the indication light 8.

When the call control unit 10 receives the data piece of "00" from the voice recognition unit 11 and, after that, receives a piece of data of "03" signifying that a second keyword was recognized, the call control unit sends the data piece of "03" to the car control unit 12. When the car control unit 12 determines that the third floor corresponding to the data piece of "03" can be registered, the call control unit 10 not only outputs a voice of "the third floor was registered" or a bleep of "Pipi" from the speaker 9, but also lights a lamp built in a destination button 5 assigned to the registered third floor.

In contrast, in a case where a new registration is impossible because, for example, the third floor is located on a side opposite to the traveling direction of the car 1, the car control unit 12 sends back to the call control unit 10 a response that the registration is impossible, so that the call control unit 10 outputs a voice of "Could not register" or a sound of "Buboo" from the speaker 9 to express an unsuccessful registration.

Figure 3:
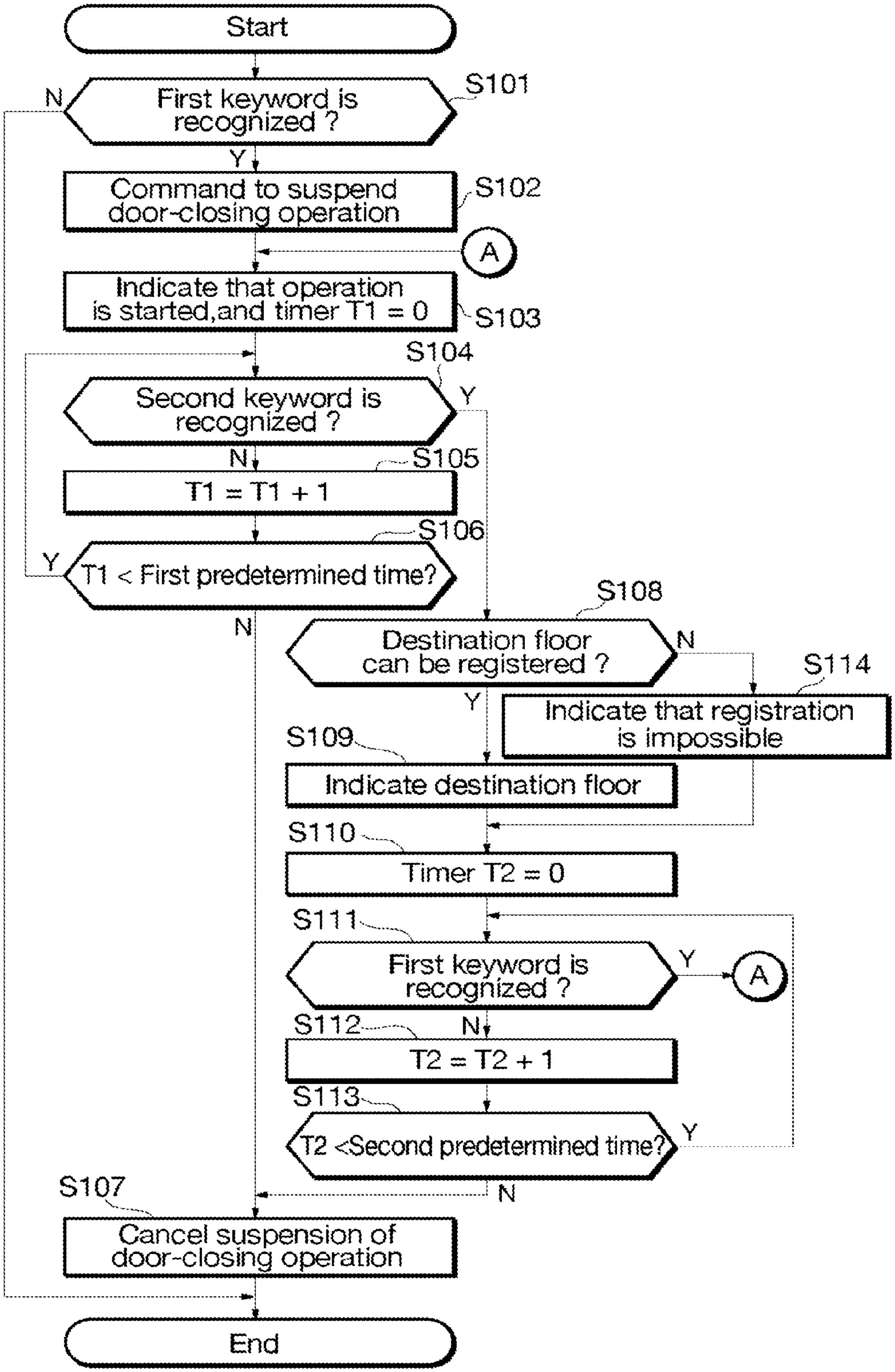
FIG. 3 is an operation flow chart of the elevator control device of Embodiment 1 according to the present invention.

Next, explanation will be made about procedures of destination floor specifying operations to be performed by the passenger's voice, using a flow chart shown in FIG. 3. When the car 1 arrives at a hall, the car control unit 12 outputs a door opening command to the car-door driving unit 14; and then, after the door 2 of the car 1 fully opens, the voice recognition unit 11 compares the passenger's voice that is inputted from the microphone 6 with the keywords stored in the memory unit 15 and determines whether or not any one of the first keywords is recognized (step S101). If none of the first keywords is recognized, the process ends.

In a case where the voice recognition unit 11 recognizes a first keyword at step S101, the voice recognition unit sends a piece of data of "00" signifying a result of a first keyword recognition to the call control unit 10, and then the call control unit 10 outputs, to the car control unit 12, a command to suspend a door closing operation (step S102); by this command signal, a door closing command from the car control unit 12 to the car-door driving unit 14 is inhibited.

Next, the call control unit 10 not only lights the indication light 8 but also outputs a blip of "Pi" from the speaker 9 to indicate to the passenger that a destination floor specifying operation by voice has started. Furthermore, the call control unit 10 sets "0" to a timer T1 for measuring a first predetermined time (step S103).

After that, the voice recognition unit 11 compares the passenger's voice inputted from the microphone 6 with the keywords stored in the memory unit 15, to determine whether or not a second keyword is recognized (step S104). Here, in a case where a second keyword is not recognized, "1" is added to the timer T1 (step S105); and in a case where the value of the timer T1 is smaller than the first predetermined time, the process returns to step S104 (step S106).

In contrast, in a case where the value of the timer T1 reaches the first predetermined time, it is determined that the destination floor specifying operation has ended, and the call control unit 10 outputs, to the car control unit 12, a command to cancel the suspension of the door closing operation (step S107); after that, a door closing command from the car control unit 12 to the car-door driving unit 14 is effective. That ends the process. In the above process, the first predetermined time is set to be, for example, four seconds, so that a single passenger can surely complete a destination floor specifying operation by voice.

In a case where the voice recognition unit 11 recognizes a second keyword at step S104, the voice recognition unit sends a piece of data of "03" signifying a destination floor (in a case of the third floor) to the call control unit 10, and the call control unit 10 sends the data piece of "03" to the car control unit 12. When the car control unit 12 determines that the third floor can be registered (step S108), the car control unit 12 sends back to the call control unit 10 a response that registration is possible, so that the call control unit 10 not only outputs a voice of "the third floor was registered" or a bleep of "Pipi" from the speaker 9 but also lights a lamp built in a destination button 5 assigned to the registered third floor (step S109).

Next, the call control unit 10 set "0" to a timer T2 for measuring a second predetermined time (step S110). After that, the voice recognition unit 11 compares the passenger's voice inputted from the microphone 6 with the keywords stored in the memory unit 15, to determine whether or not a first keyword is recognized (step S111). Here, in a case where a first keyword is not recognized, "1" is added to the timer T2 (step S111); and in a case where the value of the timer T2 is smaller than the second predetermined time, the process returns to step S111 (step S113).

In contrast, in a case where the value of the timer T2 reaches the second predetermined time, it is determined that the destination floor specifying operation is to be ended, so that the process proceeds to step S107. In a case where a first keyword is recognized at step S111, the process returns to step S103 to continue the steps for specifying the next destination floor. Here, the second predetermined time is set to be, for example, four seconds similarly to the first predetermined time.

In a case where a new registration is impossible at step S108 because, for example, a third floor signified by the data piece of "03" is located on a side opposite to the traveling direction of the car 1, the car control unit 12 sends back to the call control unit 10 a response that the registration is impossible, so that the call control unit 10 outputs a voice of "Could not register" or a sound of "Buboo" from the speaker 9 to express an unsuccessful registration (step S114), and the process proceeds to step S110.

So far, explanation has been made about procedures for destination floor specifying operations to be performed by the passenger's voice, using the flow chart shown in FIG. 3; a method will be explained in which after the passenger utters a first keyword signifying a start of a destination floor specifying operation, the destination floor specifying operation is canceled by voice. In a case where after the voice recognition unit 11 recognizes a first keyword uttered by the passenger, the passenger sees a lamp built in a destination button 5 lighting, to notice that the desired destination floor has been already registered, the destination floor specifying operation is ended after a lapse of the first predetermined time without any operations by the passenger; however, this requires a period such as four seconds.

On the other hand, in a case where after the voice recognition unit 11 recognizes a first keyword uttered by the passenger, the voice recognition unit 11 recognizes a third keyword such as "end" uttered by the passenger to signify the end of the destination floor specifying operation, the call control unit 10 determines that the destination floor specifying operation is to be ended, so that the process proceeds to step S107. This cancels the suspension of the door closing operation without waiting for expiration of the first predetermined time, thereby reducing time for the car 1 to begin traveling.

Furthermore, even after a first keyword is recognized and then a second keyword is recognized, recognition of a third keyword can cause the call control unit 10 to determine that the destination floor specifying operation is to be ended. This cancels, in a case where a destination floor specifying operation is performed by a single passenger, the suspension of the door closing operation without waiting for expiration of the second predetermined time after the second keyword recognition, thereby reducing time for the car 1 to begin traveling.

Here, four seconds have been used in common as examples for the first predetermined time and the second predetermined time; however, it is not necessarily required that they are the same. Each of them may be varied according to the installation place of elevator or the utilization purpose thereof. Furthermore, in a case where two or more passengers specify destination floors by voice, the passengers may yield to each other, taking more time in comparison to a single passenger case. Thus, the call control unit 10 may determine the first predetermined time and the second predetermined time according to the number of passengers inputted from the imaging device 4 detecting the number of passengers to get in the car 1. For example, in a case of two or more passengers, by setting a longer time such as six seconds to the first and second predetermined times, the destination floor specifying operation by voice can be reliably completed even if there is a loss time due to yielding to each other. On the other hand, in a case of a single passenger, zero seconds may be set to the second predetermined time because there is no second passenger to perform the destination floor specifying operation. This can eliminate wasteful waiting time.

Furthermore, in addition to the number of passengers inputted from the imaging device 4, the number of registered destination floors in the traveling direction from the current positon of the car 1 may be taken into account to determine the first predetermined time and second predetermined time. In a case where a lot of destination floors have been registered, so that there are few floors left to be registered anew as a destination floor, a probability for a new registration is low; therefore, it is also possible that the first and second predetermined times are not made longer even in the case of two or more passengers. Moreover, in a case where there are no destination floors left for new registration, it is allowed that the zero seconds are set for the first and second predetermined times. This can eliminate wasteful waiting time.

Here, explanation has been made using an example in which the imaging device 4 is used as the passenger number detection means to detect the number of passengers to get in the car 1; however, this is not limited to the imaging device 4, and a well-known detection device such as a device counting how many times the passenger or passengers block a photoelectric sensor provided on the door of the car 1 may be used.

Moreover, although the above explanation has been made about an example in which a destination floor specifying operation is performed after the car 1 arrives at a hall and only after the door 2 of the car 1 becomes fully open, the destination floor specifying operation may be performed after an operation for closing the door 2 of the car 1 is performed and only after the door 2 becomes fully close. In this case, the door opening operation during the destination floor specifying operation is suspended, thereby reducing destination floor misrecognition due to influence of a noise by door opening operation.

The elevator control device as configured above includes the microphone 6 that is provided in the car 1 to receive the voice of a passenger in the car 1, a memory unit 15 that, in relation to a destination floor specifying operation for the passenger to specify a destination floor by voice, stores a first keyword defined beforehand to signify a start of the operation and second keywords each defined beforehand to signify a destination floor, a voice recognition unit 11 that compares the voice inputted through the microphone 6 with the first and second keywords stored in the memory unit 15, and a control unit that, when in a state in which a door 2 of the car 1 is fully opened or fully closed, the voice recognition unit 11 recognizes the first keyword and thereafter recognizes one of the second keywords, registers a destination floor corresponding to the one of the second keywords, wherein if the voice recognition unit 11 recognizes one of the second keywords within a first predetermined time after the recognition of the first keyword and does not recognize anew the first keyword within a second predetermined time after the recognition of the one of the second keywords, the control unit outputs a command to suspend an operation of opening and closing the door 2 of the car 1 until the second predetermined time passes after the recognition of the one of the second keywords.

This suspends the car door opening/closing operation after the passenger in the car 1 utters the first keyword signifying to start a destination floor specifying operation until the destination floor specifying operation ends; therefore, it is possible to reduce destination floor misrecognition caused by the influence of the door opening/closing operation noises. Furthermore, when an utterance irrelevant to the destination floor specifying operation occurs, the operation of opening/closing the door 2 of the car 1 is not suspended, which curbs lowering the operation efficiency. Moreover, even in a case of plural passengers performing the destination floor specifying operation, provision of the second predetermined time after recognizing the second keyword causes, when recognizing the first keyword of a second passenger after the first passenger's operation, the operation of opening/closing the door 2 of the car 1 to be kept suspended, which thereby can reduce misrecognition of respective destination floors specified by the plural passengers.

Moreover, in a case where the voice recognition unit 11 recognizes the first keyword and thereafter does not recognize the second keyword within the first predetermined time, the control unit outputs a command to suspend an operation to open or close the door of the car from the recognition of the first keyword until the first predetermined time passes. By this operation, a determination to end the destination floor specifying operation is made when a predetermined time passes after the recognition of the first keyword, which thereby reduces wasteful time for waiting in a case of no second keyword utterance.

Moreover, because the imaging device 4 is provided that detects, when the car 1 stops at a hall, the number of passengers to get in the car 1, the control unit can determine the first predetermined time and the second predetermined time according to the detected passenger number. In this operation, the first and second predetermined times are made longer in a case of two or more passengers than those in a case of a single passenger, whereby the destination specifying operation can be reliably performed even when a lot of time is taken because of the yielding to each other.

Furthermore, the control unit can determine the first predetermined time and second predetermined time according to the number of passengers and the number of destination floors having been registered. In this operation, it is also possible that in a case where a lot of destination floors have already been registered and there are few destination floors to be registered anew, the first and second predetermined times are not made longer even when the number of passengers is two or more.

Furthermore, the memory unit 15 stores not only the first and second keywords but also the third keywords defined beforehand to signify the end of the destination floor specifying operation; the voice recognition unit 11 compares a voice inputted from the microphone 6 with not only the first and second keywords stored in the memory unit 15 but also the third keywords stored therein; the control unit cancels, when the voice recognition unit 11 recognizes a first keyword and thereafter recognizes a third keyword, the command to suspend the operation to open or close the door 2 of the car 1. By this operation, the destination floor specifying operation by the passenger's voice can be ended; by this operation, the suspension of the operation to open or close the door is canceled, which thereby can reduce time taken to start the car 1 traveling.

Furthermore, the indication light 8 and the speaker 9 are provided which, after the voice recognition unit 11 recognizes the first keyword, indicate in the car 1 that a destination floor specifying operation starts. With these operations, the passenger having uttered the first keyword can confirm that the destination floor specifying operation starts.

Moreover, there are provided the speaker 9 and the lamp of the destination button 5 that indicate inside the car 1, whether or not the destination floor specified by the control unit is registered. This allows the passenger having uttered the second keyword to confirm whether or not the destination floor is registered.

NUMERAL EXPLANATION

1 car
2 door
4 imaging device
6 microphone
8 indication light
9 speaker
10 call control unit
11 voice recognition unit
12 car control unit
15 memory unit

The invention claimed is:

1. An elevator control device comprising:

a voice input unit that is provided in a car to receive a voice of a passenger in the car;

a memory that, in relation to a destination floor specifying operation for the passenger to specify a destination floor by voice, stores a first keyword defined beforehand to signify a start of the operation and second keywords each defined beforehand to signify a destination floor;

a voice recognition unit that compares the voice inputted through the voice input unit with the first and second keywords stored in the memory; and a controller that, when in a state in which a door of the car is fully opened or fully closed, the voice recognition unit recognizes the first keyword and thereafter recognizes one of the second keywords, registers a destination floor corresponding to the one of the second keywords, wherein when the voice recognition unit recognizes the first keyword, the controller outputs a command to suspend an operation of opening and closing the car door, and thereafter outputs a command to cancel the suspension, and wherein if the voice recognition unit recognizes one of the second keywords within a first predetermined time after the recognition of the first keyword and does not recognize anew the first keyword within a second predetermined time after the recognition of the one of the second keywords, the controller outputs a command to cancel the suspension of the operation of opening and closing the car door when the second predetermined time passes after the recognition of the one of the second keywords.

2. The elevator control device according to claim 1, wherein if the voice recognition unit does not recognize any of the second keywords within the first predetermined time after the recognition of the first keyword, the controller outputs a command to cancel the suspension of the operation of opening and closing the car door when the first predetermined time passes after the recognition of the first keyword.

3. The elevator control device according to claim 1, further comprising:

a passenger number detection means that detects, when the car stops at a hall, the number of passengers to get in the car, wherein the controller determines the first predetermined time and the second predetermined time according to the detected number of passengers.

4. The elevator control device according to claim 2, further comprising:

a passenger number detection means that detects, when the car stops at a hall, the number of passengers to get in the car, wherein the controller determines the first predetermined time and the second predetermined time according to the detected number of passengers.

5. The elevator control device according to claim 3, wherein the controller determines the first predetermined time and the second predetermined time according to the number of destination floors having already been registered.

6. The elevator control device according to claim 4, wherein the controller determines the first predetermined time and the second predetermined time according to the number of destination floors having already been registered.

7. The elevator control device according to claim 1, wherein the memory stores not only the first and second keywords but also a third keyword defined beforehand to signify the end of the destination floor specifying operation, the voice recognition unit compares a voice inputted from the voice input unit with not only the first and second keywords stored in the memory but also the third keywords stored therein, and the controller outputs, when the voice recognition unit recognizes the first keyword and thereafter recognizes the third keyword, a command to cancel the suspension of the operation of opening and closing the car door.

8. The elevator control device according to claim 2, wherein the memory stores not only the first and second keywords but also a third keyword defined beforehand to signify the end of the destination floor specifying operation, the voice recognition unit compares a voice inputted from the voice input unit with not only the first and second keywords stored in the memory but also the third keywords stored therein, and the controller outputs, when the voice recognition unit recognizes the first keyword and thereafter recognizes the third keyword, a command to cancel the suspension of the operation of opening and closing the car door.

9. The elevator control device according to claim 2, wherein the memory stores not only the first and second keywords but also a third keyword defined beforehand to signify the end of the destination floor specifying operation, the voice recognition unit compares a voice inputted from the voice input unit with not only the first and second keywords stored in the memory but also the third keywords stored therein, and the controller outputs, when the voice recognition unit recognizes the first keyword and thereafter recognizes the third keyword, a command to cancel the suspension of the operation of opening and closing the car door.

10. The elevator control device according to claim 6, wherein the memory stores not only the first and second keywords but also a third keyword defined beforehand to signify the end of the destination floor specifying operation, the voice recognition unit compares a voice inputted from the voice input unit with not only the first and second keywords stored in the memory but also the third keywords stored therein, and the controller outputs, when the voice recognition unit recognizes the first keyword and thereafter recognizes the third keyword, a command to cancel the suspension of the operation of opening and closing the car door.

11. The elevator control device according to claim 1, further comprising:

a first indicator that, after the voice recognition unit recognizes the first keyword, indicates inside the car that the destination floor specifying operation starts.

12. The elevator control device according to claim 2, further comprising:

a first indicator that, after the voice recognition unit recognizes the first keyword, indicates inside the car that the destination floor specifying operation starts.

13. The elevator control device according to claim 3, further comprising:

a first indicator that, after the voice recognition unit recognizes the first keyword, indicates inside the car that the destination floor specifying operation starts.

14. The elevator control device according to claim 7, further comprising:

a first indicator that, after the voice recognition unit recognizes the first keyword, indicates inside the car that the destination floor specifying operation starts.

15. The elevator control device according to claim 9, further comprising:

a first indicator that, after the voice recognition unit recognizes the first keyword, indicates inside the car that the destination floor specifying operation starts.

16. The elevator control device according to claim 1, further comprising:

a second indicator that indicates inside the car whether or not a destination floor specified by the controller is registered.

17. The elevator control device according to claim 2, further comprising:

a second indicator that indicates inside the car whether or not a destination floor specified by the controller is registered.

18. The elevator control device according to claim 3, further comprising:

a second indicator that indicates inside the car whether or not a destination floor specified by the controller is registered.

19. The elevator control device according to claim 7, further comprising:

a second indicator that indicates inside the car whether or not a destination floor specified by the controller is registered.

20. The elevator control device according to claim 14, further comprising:

a second indicator that indicates inside the car whether or not a destination floor specified by the controller is registered.

* * * * *